Oct. 20, 1959  J. GARDBERG  2,909,604
SIGNAL DISTORTION INDICATOR
Filed Nov. 27, 1956  7 Sheets-Sheet 1

INVENTOR
JOSEPH GARDBERG
BY Emery Robinson
ATTORNEY

Oct. 20, 1959  J. GARDBERG  2,909,604
SIGNAL DISTORTION INDICATOR
Filed Nov. 27, 1956  7 Sheets-Sheet 2

INVENTOR
JOSEPH GARDBERG
BY Emery Robinson
ATTORNEY

Oct. 20, 1959 J. GARDBERG 2,909,604
SIGNAL DISTORTION INDICATOR
Filed Nov. 27, 1956 7 Sheets-Sheet 5

INVENTOR
JOSEPH GARDBERG
BY Emery Robinson
ATTORNEY

Oct. 20, 1959    J. GARDBERG    2,909,604
SIGNAL DISTORTION INDICATOR
Filed Nov. 27, 1956

INVENTOR
JOSEPH GARDBERG
BY Emery Robinson
ATTORNEY

| FIG. 4 | FIG. 5 | FIG. 6 | FIG. 7 | FIG. 8 |

INVENTOR
JOSEPH GARDBERG
BY Emery Robinson
ATTORNEY

United States Patent Office 2,909,604
Patented Oct. 20, 1959

2,909,604
SIGNAL DISTORTION INDICATOR

Joseph Gardberg, Chicago, Ill., assignor to Teletype Corporation, Chicago, Ill., a corporation of Delaware Application November 27, 1956, Serial No. 624,591

10 Claims. (Cl. 178—69)

This invention relates to a signal distortion indicator and more particularly to a signal indicator for indicating the type and amount of distortion in telegraph signals.

Telegraph distortion may be conveniently divided into four types. The various types of distortion that affect telegraph signals are marking bias, spacing bias, spacing end distortion and marking end distortion. Any of these types or combinations of these types can be introduced into a telegraph signal by some asymmetrical conditions such as voltage unbalance, improper relay adjustment or changes in the received signal strength which may cause all marks to be either too long or too short.

By "marking bias" is meant that the space-to-mark transition of each marking pulse in a start-stop telegraph signal has been advanced with respect to the normal space-to-mark transition. In like manner, the term "spacing bias" designates a condition wherein the space-to-mark transition of each marking pulse is retarded with respect to the normal space-to-mark transition. The term "marking end distortion" refers to a condition where the mark-to-space transition of each marking pulse in a signal is retarded with respect to the normal mark-to-space transition. Conversely, the term "spacing end distortion" indicates a condition wherein the mark-to-space transition of each marking pulse in a signal is advanced with respect to the normal mark-to-space transition.

Indicators have been developed for presenting a representation of distortion in telegraph signals on a cathode ray oscilloscope. In some of these indicators, the display on the oscilloscope has been on a straight linesweep and in others it has been on a two line sweep. In the latter case, one of the lines indicates distortion in the marking pulses present in the signal while the second line indicates distortion in the spacing pulses. Still other indicators have been provided wherein each pulse of a signal is displayed on the oscilloscope, but in none of these devices has an extremely accurate representation been assured. Further, in all previous indicators, the amount of distortion is determined by calibration markers printed on a transparent covering placed over the face of the oscilloscope.

An object of this invention is to provide a new and improved signal distortion indicator.

Another object of the invention is to provide a new and improved signal distortion indicator having a higher degree of accuracy and greater ease of operation than any such apparatus devised heretofore.

A still further object of the invention is to provide a signal distortion indicator wherein a new and improved system of sweep generation is utilized.

Still another object of the invention is to provide a signal indicator having an oscilloscope type of display wherein calibration markers to determine the amount of distortion are incorporated directly on the oscilloscope sweep.

With these and other objects in view, a signal distortion indicator embodying the invention may include cathode ray means having a pair of deflection plates, an integrator circuit having an output connected to the plates, means for generating voltage pulses that are positive and negative with respect to a reference voltage, and means for applying predetermined numbers of the positive and negative pulses alternately to the integrator to develop at the output thereof a voltage having a triangular waveform.

More specifically, the present invention contemplates a distortion signal indicator wherein an oscilloscopic display is offered in which a ladder-type sweep permits individual pulse observation and recognition. The sweep is calibrated by vertical deflection of the sweep itself, thereby making reading of the distortion free of parallax as well as permitting expansion and horizontal positioning of the sweep without loss of calibration.

The speed of operation is determined solely by a crystal which provides the time base of an oscillator. All other circuits are independent of frequency within the limits of the design. A digital count down of the crystal oscillator by a counter circuit is used for generating the calibration markers so that a greater degree of accuracy is obtained than heretofore available.

The system includes a gating circuit which controls the output of the continuously-operating oscillator. The gating circuit is opened by the first spacing pulse (the start pulse) of a telegraph signal and closed by the counter circuit one-half of a pulse after the initiation of the stop pulse. Thus, the measuring circuit is under the control of the incoming character pulses so that synchronism with the incoming signal is assured.

The output of the oscillator drives the counter circuit such that 1000 pulses from the oscillator elapse for each pulse period of the signal to be indicated. The oscillator output also causes generation of the oscilloscope sweep. The circuitry is such that 500 oscillator pulses during each signal pulse cause positive voltages to be sent to an integrator in the horizontal sweep circuit, and the remaining 500 pulses cause negative voltages to be sent thereto. The integrator output energizes the horizontal plates of the oscilloscope and places thereon a sawtooth voltage which rises for the first half of each pulse and falls during the last half to its original value. The reversal of the integrator precisely at the half-way point of each pulse is controlled by the counter circuit.

The vertical component of the sweep is generated in a somewhat similar fashion as the horizontal component, except that negative voltages only are increased after each 500 oscillator pulses so that, when combined with the horizontal component of the sweep, a ladder-type sweep is displayed on the oscilloscope. The starting points of the integrators are clamped during the stop impulse of the signal being indicated to a voltage which would return the oscilloscope trace to its proper position at the corner of the sweep. When so positioned, the sweep is capable of being restored by the next-succeeding spacing pulse.

To facilitate indication of the class of distortion present, a group of four lamps is energized to indicate the type of distortion present. These lamps are marked marking bias, spacing bias, marking end distortion and spacing end distortion. The distortion class indicator can be used in conjunction with a counter to provide a "miss" indicator. Provision is made to adjust the amount of signal variation from the perfect signal that will be tolerated before there is a recognition of a miss.

Other objects and advantages of the present invention will be apparent from the following detailed description, when considered in conjunction with the accompanying drawings wherein.

Figure 6:
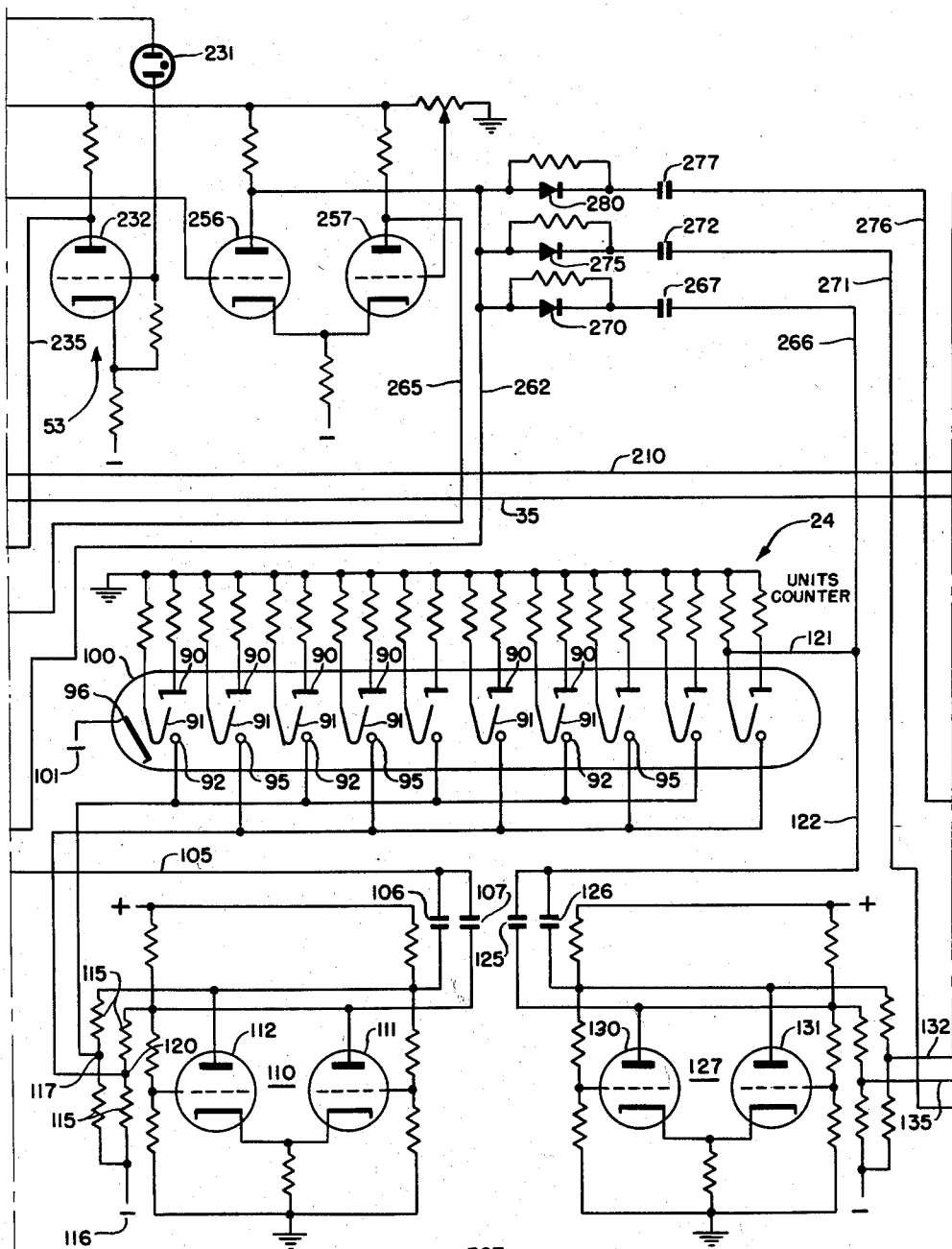
Figure 1:
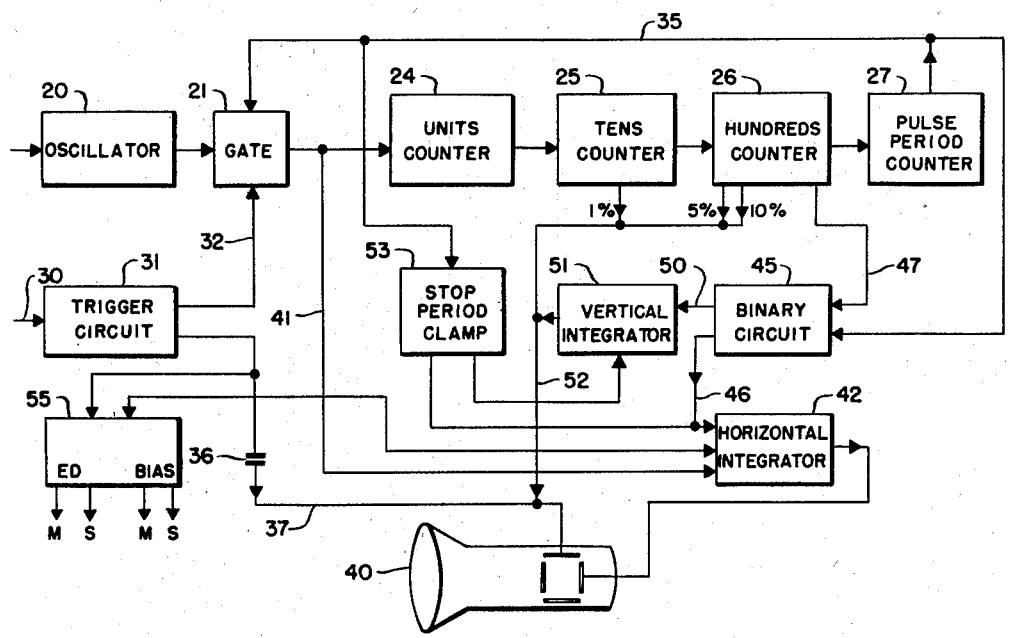
Fig. 1 is a block diagram of an apparatus embodying the present invention.
Figure 10:
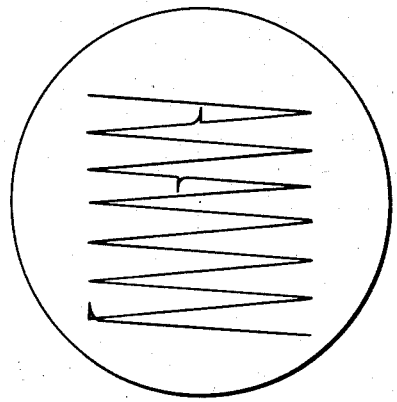
Figure 11:
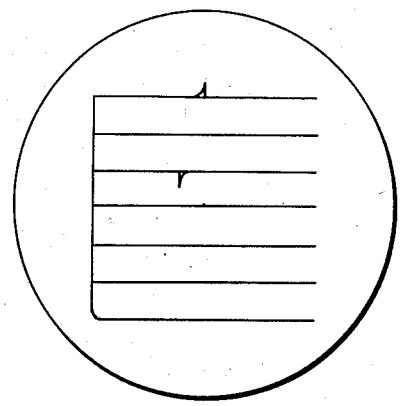
Figure 7:
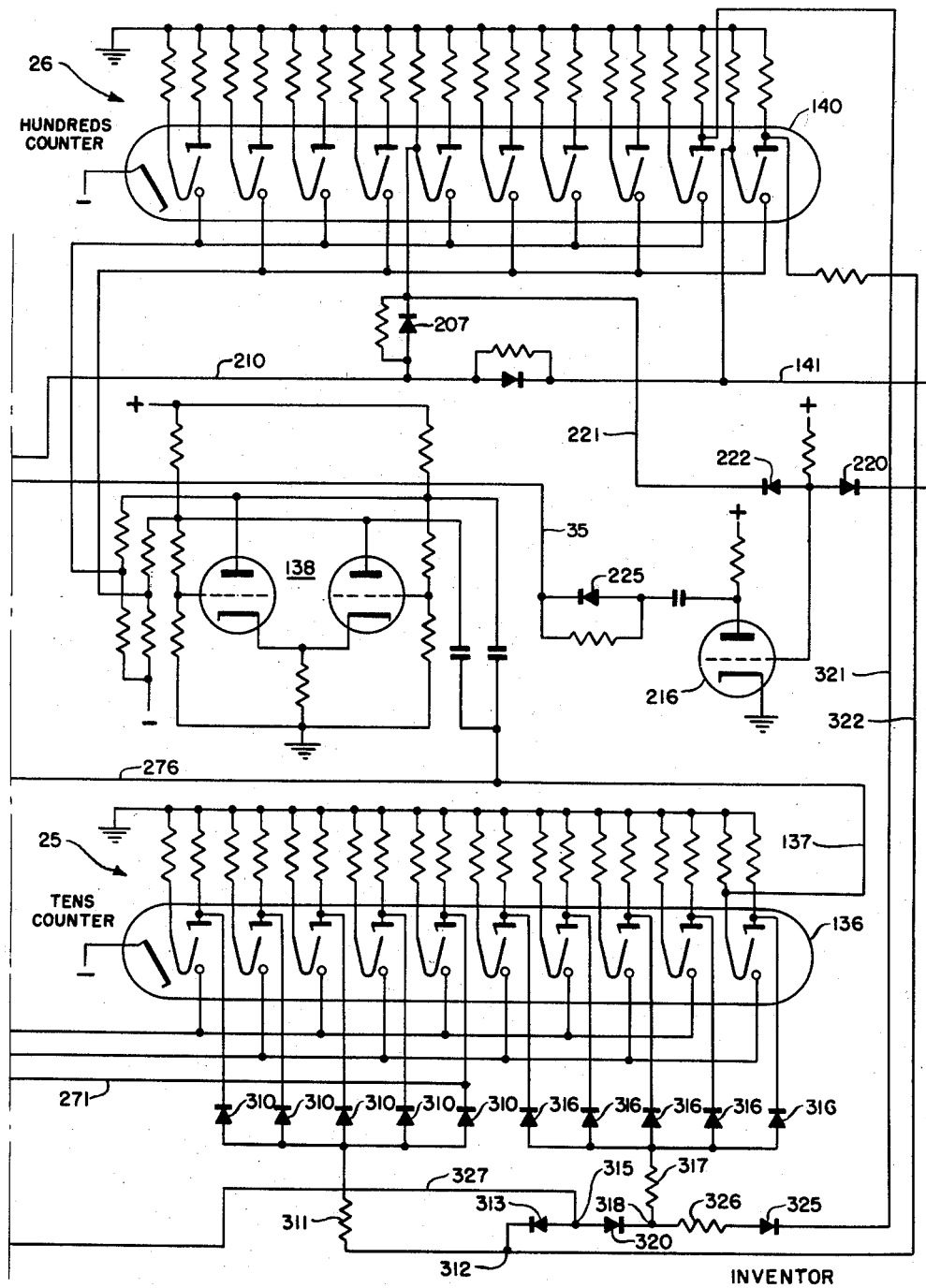
Figures 8, 9:
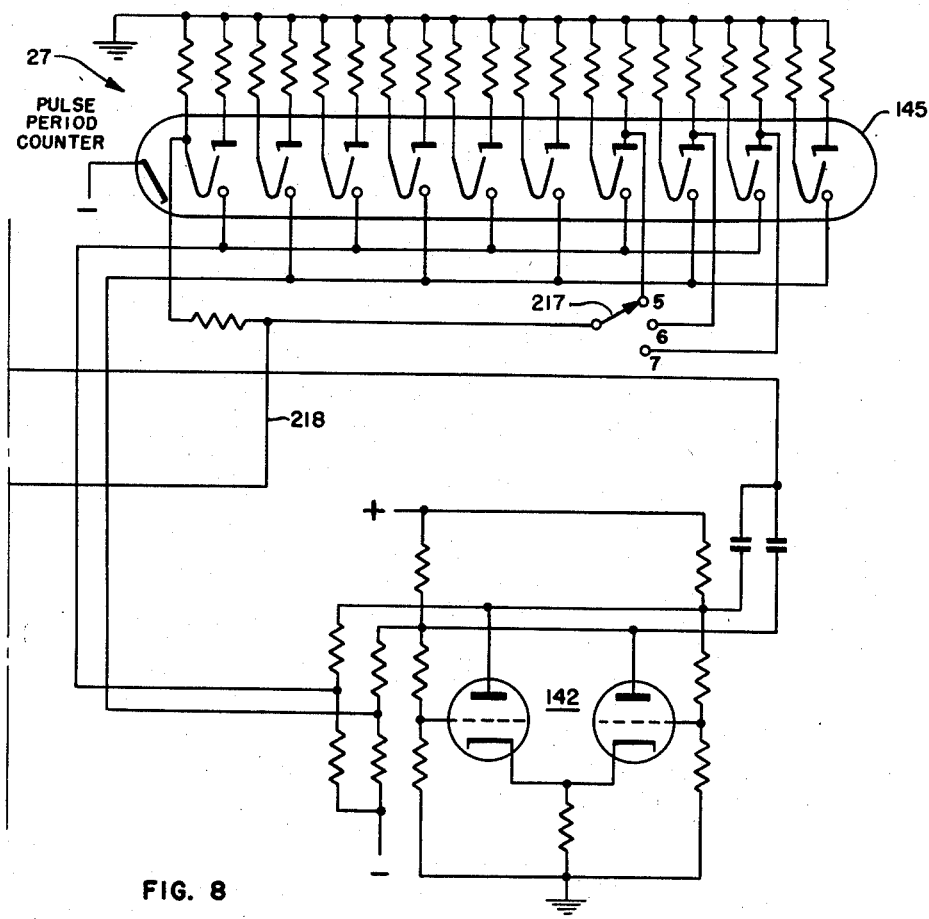

Figs. 4 to 8, inclusive, when assembled as depicted in Fig. 9, show a schematic diagram of the apparatus embodying the invention shown in the block diagram of Fig. 1; and Figs. 10 and 11 show two other types of oscilloscopic displays that can be generated with the apparatus embodying the invention.

*General description*

Figure 2:
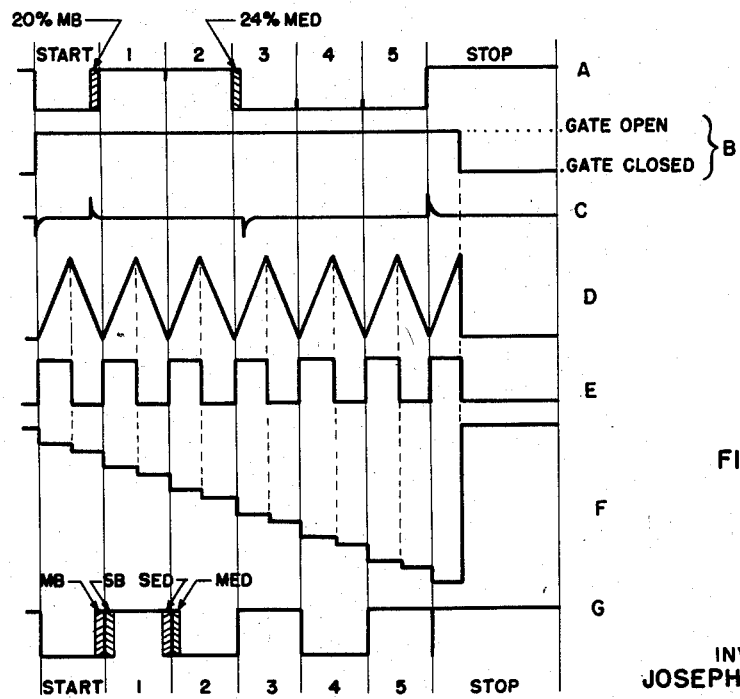
Fig. 2 is a chart illustrating waveforms at various points on the block diagram in Fig. 1, and other waveforms to be used in describing the invention.
Figure 3:
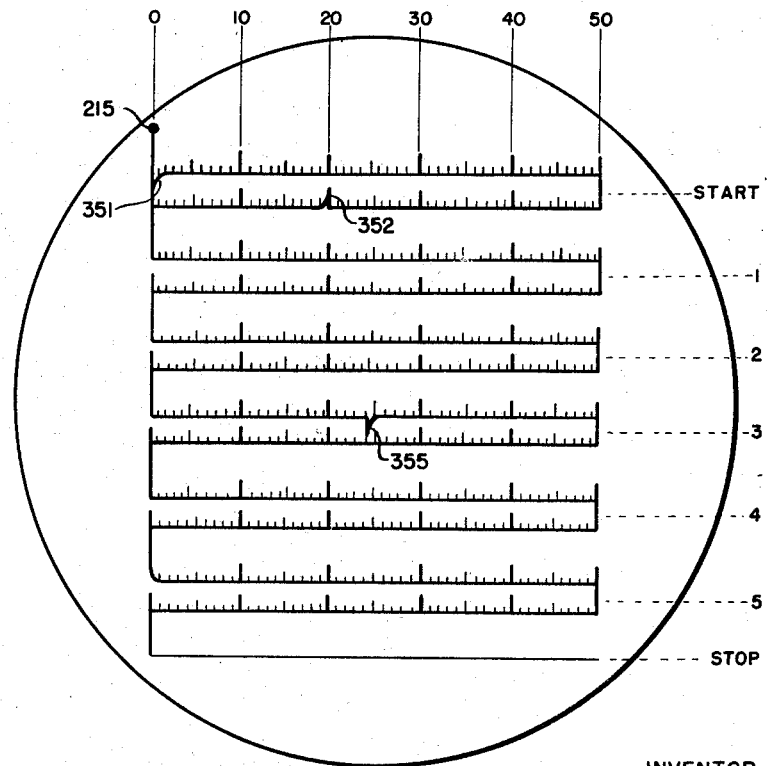
Fig. 3 illustrates one type of an oscilloscopic display provided by the present invention.

Referring now to Figs. 1, 2 and 3, a crystal controlled oscillator 20 provides a precise output which is passed through a gating circuit 21 to a plurality of counter circuits 24 to 27, inclusive. Each of the counter circuits has ten successively-operated stages with each of the stages in the counter 27 operating for a length of time equal to the length of a pulse period. For this reason, the counter 27 is designated as a "pulse period counter." The counters 24, 25 and 26 are designated, respectively, units, tens, and hundreds counters. Since each of the counters has ten stages, there will be one thousand counts or one thousand pulses from the oscillator 20 needed to step the pulse period counter 27 one stage. If different signal pulse lengths are used, the only change required is that of the oscillator frequency, and this can be accomplished simply by changing the crystals therein.

A signal, the distortion in which is to be indicated and an example of which is shown in waveform A in Fig. 2, is applied over a line 30 to a trigger circuit 31. The trigger circuit 31 is designed to respond to all transitions of the incoming signals on the line 30, but the first spacing pulse therefrom is applied over a lead 32 to open the gating circuit 21 as shown in waveform B in Fig. 2. When the gating circuit 21 is opened, the output of the oscillator 20 can pass therethrough. The counter circuits 24 to 27, inclusive, are designed such that, when a five-unit signal is to be analyzed, after six and one-half pulse periods have elapsed an output is taken from the pulse period counter 27 and passed over a lead 35 to close the gating circuit 21. The gating circuit will, therefore, not be opened again until another spacing pulse is applied to the signal line 30. The system will soon synchronize with the signals on the line 30 so that the spacing pulse referred to is the start pulse. It can be seen then, that the operation of the signal indicator embodying the invention is completely under the control of the incoming signals applied to the line 30.

The signals being applied to the trigger circuit 31 are taken therefrom, differentiated by a capacitor 36 and applied over a lead 37 so that a voltage having a waveform as shown at C in Fig. 2 is applied to the vertical plates of an oscilloscope 40. To provide ease and accuracy of determination of the signal distortion, the oscilloscopic display embodies a ladder-type sweep as shown in Fig. 3. With such a sweep, maximum readability of the timing of the pulse transitions in each pulse period is obtained since each pulse is spread over two sweeps of the oscilloscope trace. To obtain the ladder-type sweep, a sawtooth voltage such as shown at waveform D in Fig. 2 must be applied to the horizontal plates of the oscilloscope 40. Such a voltage is obtained by passing the oscillator output from the gating circuit 21, over a lead 41 and to a horizontal integrator 42. A sweep control binary circuit 45, connected over a lead 46 to the horizontal integrator 42 and having an output voltage shown in waveform E in Fig. 2, is provided to cause the integrator 42 to integrate the output of the oscillator 20 in a positive direction over five hundred of the one thousand counts in each pulse period. The binary circuit 45 is energized by an output of the hundreds counter, which is applied over a lead 47 thereto, to cause the binary to change at exactly five hundred counts. Consequently, the positive-going portions of the saw-tooth pulses are obtained during the first half of each signal pulse. After one-half of the pulse period has elapsed, the binary circuit 45 is designed to cause the horizontal integrator 42 to integrate the output of the oscillator 20 in a negative direction for the remaining five hundred counts of each pulse period. Consequently, each outgoing portion (left to right) and incoming portion (right to left) of the ladder-type sweep is generated by one-half the total number of counts in a given pulse period to provide an accurate voltage in each direction.

To provide the vertical component of the ladder-type sweep, an output is taken from the binary 45 and applied over a lead 50 to a vertical integrator 51. The output of the vertical integrator 51 is shown in waveform F in Fig. 2 and is passed over a lead 52 to the vertical plates of the oscilloscope. It will be noted that the horizontal integrator 42 and the vertical integrator 51 are both controlled by the output of the binary circuit 45 which changes each one-half pulse period (waveform E in Fig. 2). Consequently, after the first half of each horizontal sweep for any pulse period is generated, the sweep will move down vertically so that the next half of the sweep moves horizontally in the opposite direction and at a lower vertical level. As shown in Fig. 3, the resultant sweep displays the start pulse, each of five intelligence pulses and approximately one-half of the stop pulse in each signal. At the end of six and one-half pulse periods, that is, during the stop period of the signal, both the horizontal and vertical components of the sweep are placed back to their original conditions by a stop period clamp 53 which is energized by the voltage on the lead 35.

Other features of the invention to be described more fully hereinafter, include means for placing calibration markers directly on the sweep as shown in Fig. 3. Briefly, 1%, 5% and 10% markers are derived from outputs of the tens counter 25 and the hundreds counter 26 and passed directly to the vertical plates of the oscilloscope 40. Also, a class distortion indicator circuit, designated generally by the numeral 55 in Fig. 1 is provided with a plurality of signal lamps for indicating which type of distortion is present in the signal being represented on the oscilloscope 40. With the circuit 55, an operator can determine immediately which type or types of distortion is present. The representation on the oscilloscope will also give this information in addition to the exact amount of distortion present in each pulse of the incoming signal.

*Gating circuit*

As described hereinbefore, when five-unit Baudot code is to be represented on the indicator embodying the invention, the pulse period counter 27 operates for six and one-half pulses. This is necessary so that the start pulse and each of the five signal impulses in each character can be represented on the oscilloscope 40. By having the indicator embodying the invention operate over six and one-half pulses, all of the pulses included in the five-unit Baudot code that can be affected by distortion will be displayed for analysis.

Figure 4:
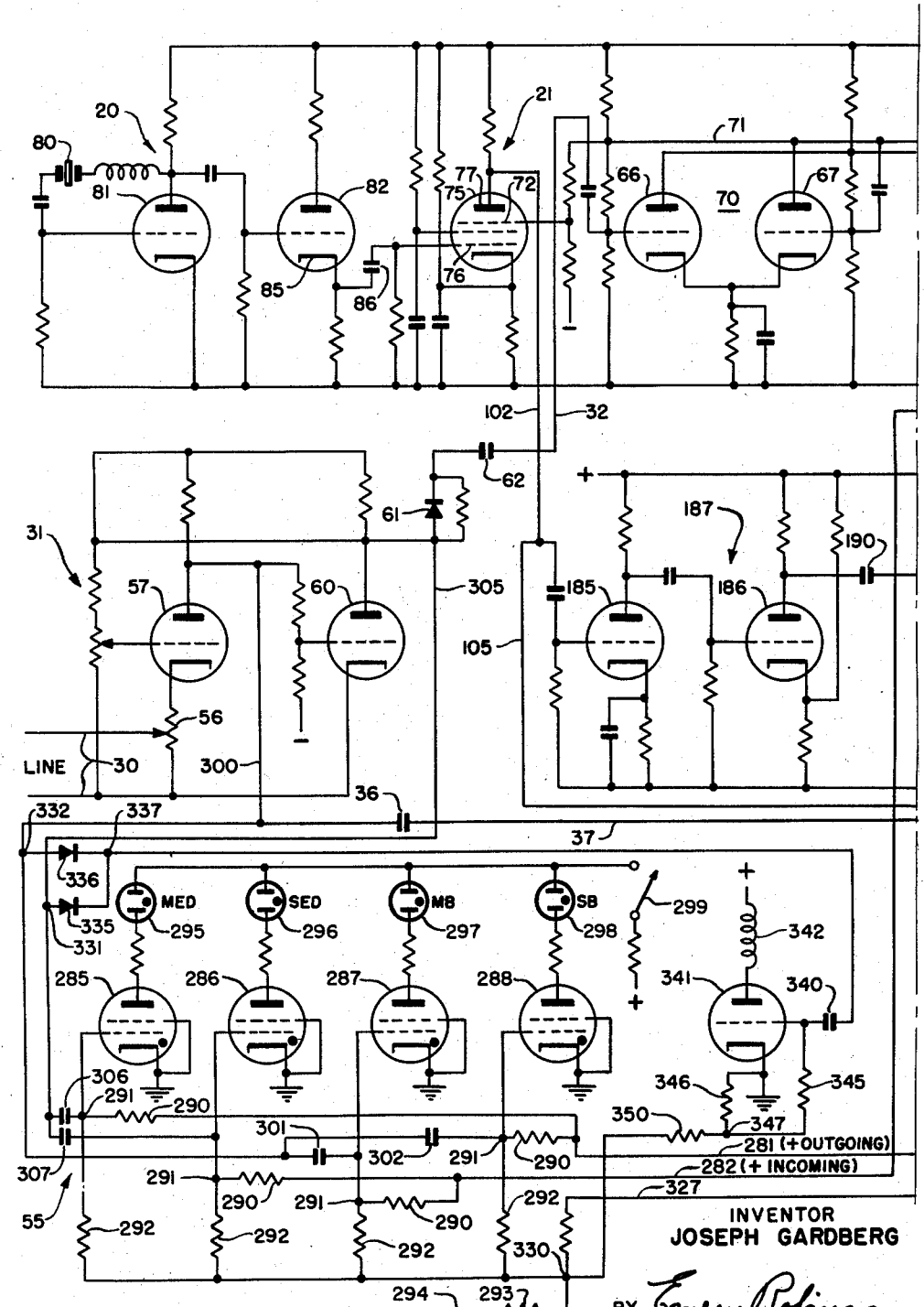

The signal indicator's operating over six and one-half pulse periods is determined by the gating circuit 21. As described above, the gating circuit 21 is opened by the initiation of the start pulse in each signal. Referring to Fig. 4, a signal, the distortion in which is to be indicated on the oscilloscope 40, is impressed on the line 30 to a tapped resistor 56. The resistor 56 is in the cathode circuit of a tube 57 which forms a part of the trigger circuit 31. Since the start pulse of a telegraph signal is a no-current condition, no current will flow through the resistor 56 during the start pulse period, and the tube 57 will conduct during this time interval. When the tube 57 conducts, its anode voltage drops to some low value and this drop is impressed upon the control grid of a tube 60, thereby cutting off the tube 60. When the tube 60 is rendered nonconductive, its anode voltage rises, and this rise in voltage passes through a diode 61 and a capacitor 62 and over the lead 32 to the grid of a tube 66. The tube 66 and a tube 67 form a gate control binary circuit 70 so that when the tube 66 is rendered conductive, its anode voltage drops to cut off the tube 67. When the tube 67 cuts off, its anode voltage rises, and this rise is impressed over a lead 71 to the grid of the tube 66 to maintain the tube 66 conductive, and to the suppressor grid 72 of a pentode 75 in the gating circuit 21. A positive voltage on the suppressor grid 72 conditions the pentode 75 so that variations in voltage impressed on a control grid 76 thereof will appear amplified at its anode 77.

As mentioned above, the pentode 75 in the gating circuit 21 remains open, that is, continues to respond to variations on its control grid 76, during six and one-half pulse periods. It can be seen that if a marking or current condition is impressed on the line 30 after the start pulse, the tube 57 will cut off and its anode voltage will rise. This voltage rise will render the tube 60 conductive so that its anode voltage will drop, and this drop in voltage cannot pass through the diode 61. Consequently, the signal on the line 30 no longer controls the operation of the gating circuit 21 after initiation of the start pulse. As will be described more fully hereinafter, after six and one-half pulse periods, a positive voltage of sufficient amplitude is impressed on the lead 35 (Figs. 5, 6 and 7) to render the tube 67 conductive so that its anode voltage drops to remove the conditioning potential from the suppressor grid 72 of the pentode 75 in the gating circuit 21. When the suppressor grid 72 of the pentode 75 is conditioned as described, variations on its control grid 76 will be developed on its anode 77. Such variations are developed by the oscillator 20, the frequency of which is determined by a crystal 80. The anode potential of an oscillator tube 81 is impressed on the grid of a cathode follower 82, and the cathode 85 thereof is connected through a capacitor 86 to the control grid 76 of the pentode 75. Consequently, the output of the oscillator 20 appears at the anode 77 of the pentode 75 from a time beginning with the initiation of the start pulse (the mark-to-space transition thereof) and continues for six and one-half pulse periods thereafter.

*Horizontal component of sweep*

In order to describe adequately the circuitry utilized to develop the horizontal component of the ladder-type sweep shown in Fig. 3, the circuitry associated with the counters 24 to 27, inclusive, must first be described. As mentioned hereinbefore, the counters 24 to 27, inclusive (Figs. 4, 5 and 6) each have ten stages associated therewith. Referring to the units counter 24 in Fig. 6, for example, each stage thereof includes a target 90, a spade 91 and a grid 92 or 95. These elements are positioned in and, with a cathode 96, form a magnetron-type beam switching tube 100. The grids 92—92 and 95—95 are utilized to effect the successive stepping of a conductive path between the common cathode 96, connected to a source 101 of negative potential, and the targets 90—90. Whenever a conductive path is established between one of the targets 90—90 and the cathode 96, the lowering of the potential of an associated grid 92 or 95 disturbs the electric field and results in a transfer of the conductive path to the next-succeeding target. The conductive path will be "locked" to a target by an associated one of the spades 91—91 until such time as the potentials of the succeeding grid 92 or 95 is lowered to effectuate another switching operation.

The counters 25, 26 and 27 are constructed similarly as the counter 24. Therefore, each time a negative pulse is impressed on one of the grids associated with a stage in these counters, the conductive beam that has been established in that stage is switched to the next-succeeding stage. In describing the generation of negative pulses to cause the stage switching, it will be seen that the grids 92—92 and 95—95 are under the control of the oscillator 20. More particularly, when the suppressor grid 72 of the pentode 75 is conditioned (during six and one-half pulse periods), the output pulses of the oscillator tube 81 pass through the cathode follower 82, are taken from the cathode 85 thereof and are impressed on the control grid 76 of the pentode 75. Since the pentode 75 is conditioned for variations on its control grid, the oscillator pulses will pass therethrough and be impressed on a lead 102.

These pulses are then passed over a lead 105 and applied to a pair of capacitors 106 and 107, associated with a units counter driver circuit 110 including the tubes 111 and 112. The tubes 111 and 112 form a flip-flop circuit so that the application of negative pulses to the grids thereof will cut off the conducting one of the tubes 111 and 112. Consequently, the negative portions of the oscillator pulses which pass over the lead 105, cause the tubes 111 and 112 to conduct alternately. Each of the anodes of these tubes is connected through a voltage divider including the resistors 115—115 to a source 116 of negative potential. As the tubes 111 and 112 conduct alternately, a circuit is established to the negative voltage source 116 to place negative potentials alternately on a pair of junction points 117 and 120. These junction points are connected, respectively, to the grids 92—92 and 95—95 of the units counter tube 100 and cause the successive operation of its stages.

As the last stage of the units counter tube 100 operates, a negative potential is developed on the spade 91 associated therewith. This negative potential is impressed on a lead 121 and applied over another lead 122 to a pair of capacitors 125 and 126. The capacitors 125 and 126 are associated with a tens counter driver circuit 127 including the tubes 130 and 131. The operation of the tens counter driver circuit 127 is similar to that of the units counter driver circuit 110 so that negative potentials are taken therefrom and applied alternately over a pair of leads 132 and 135. These negative potentials cause the successive operation of the ten stages of a magnetron type beam switching tube 136 in the tens counter stage 25.

In a similar manner, as the tenth stage of the tens counter tube 136 conducts, a negative potential is developed on the spade associated therewith and is applied to a lead 137. These negative pulses energize a hundreds counter driver circuit 138, and the ten stages associated with a beam switching tube 140 in the hundreds counter stage 26 are operated successively in a manner similar to the operation of the counter tubes 100 and 136. Also, when the tenth stage of the tube 140 conducts, a negative potential is impressed on a lead 141 and applied to a pulse period counter driver circuit 142 to render conductive successively the various stages associated with a beam switching tube 145 in the pulse period counter 27.

As described hereinabove, each stage of the pulse period counter tube 145 conducts for a length of time equal to one pulse of the incoming signal being applied to the line 30. Since each of the three beam switching tubes 100, 136 and 140 which drive the pulse period counter tube 145 has ten stages, one thousand pulses from the oscillator tube 81 are necessary to drive the pulse period counter tube 145 through each of its stages. The units counter tube 100 will step one thousand times, the tens counter tube 136 will step one hundred times and the hundreds counter tube 140 will step ten times during any one pulse period. In other words, to obtain a negative voltage after the count of one thousand, a connection to the target or spade in the tenth stage of the hundreds counter tube 140 is made and to obtain a similar voltage after a five hundred count, a similar connection to the fifth stage of the tube is made. This is important since, as mentioned above, one-half of each pulse is displayed on the oscilloscope 40 when the sweep thereof moves from left to right while the latter one-half is displayed on the oscilloscope when the sweep moves from right to left. If one thousand counts are included in a complete pulse period, this reversal of the sweep must occur after five hundred counts. When the sweep reversal is made in this manner, very accurate horizontal control of the sweep is obtained.

Figure 5:
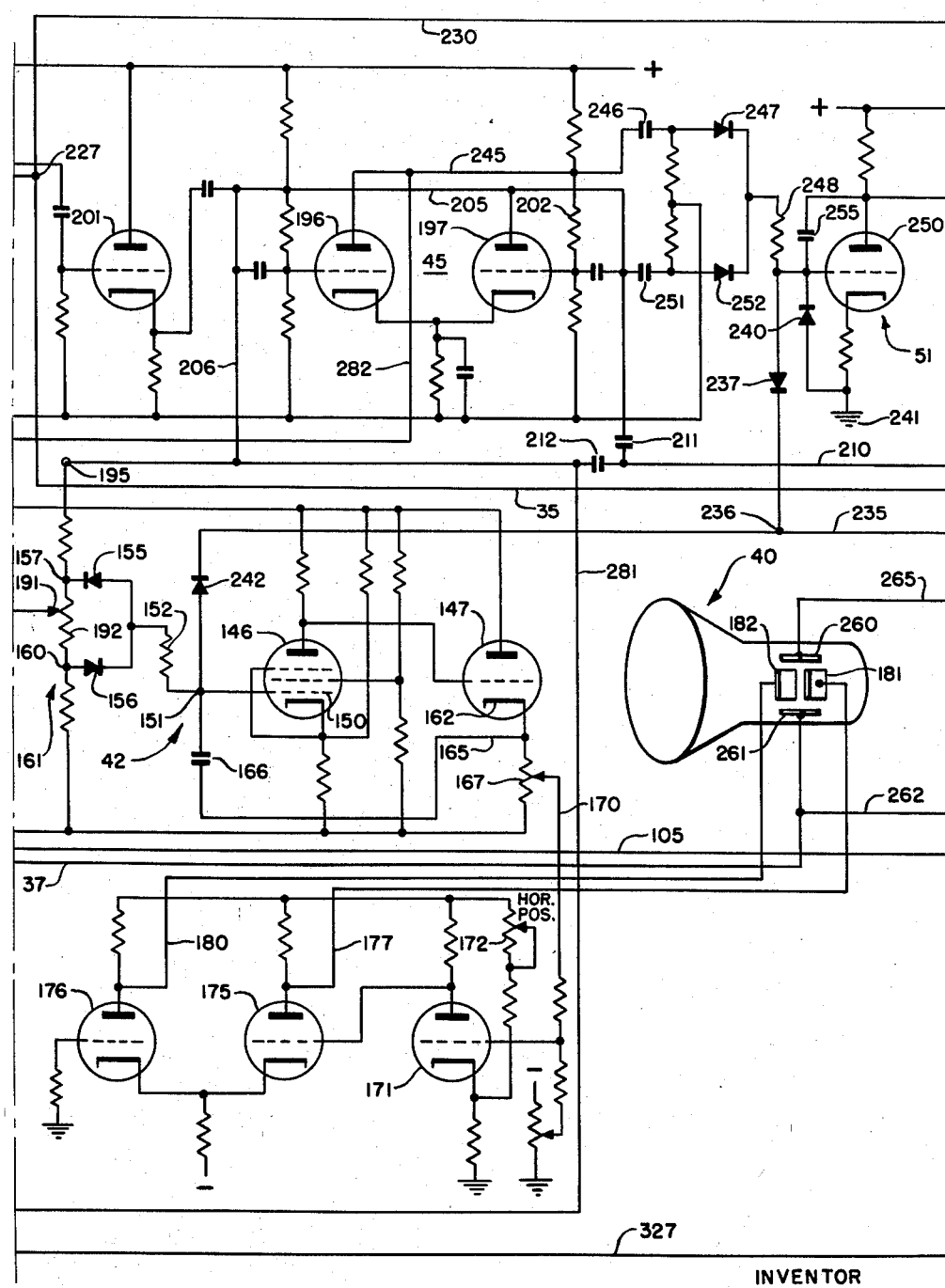

The basic circuit used to develop the horizontal component of the sweep is the horizontal integrator 42 shown in detail in Fig. 5. This circuit includes a pentode 146 and a triode 147 connected as a Miller integrator. A control grid 150 of the pentode 146 is connected to a junction point 151 and through a resistor 152 to a pair of oppositely-connected diodes 155 and 156. The other ends of the diodes 155 and 156 are connected to junctions 157 and 160, respectively, which are included in a voltage divider circuit designated by the numeral 161. With respect to the operation of the integrator circuit 42, when positive voltages are applied continuously to the junction point 151, the pentode 146 tends to conduct more, and its anode voltage tends to decrease in value. This decrease is impressed on the grid of the triode 147, connected as a cathode follower, and developed on a cathode 162 thereof. Consequently, this decrease in voltage is impressed over a lead 165 and through a large feed-back capacitor 166 to the junction point 151. As a result, the voltage at the junction point 151 which was tending to increase will be made to decrease by this feed-back circuit, and the components associated therewith are designed to maintain the voltage at the junction point 151 substantially constant. Actually the voltage will increase in extremely small steps so that the 250 such pulses that are applied to the junction point 151 during the first five-hundred counts will increase only about ¼ volt. This small increase is defined herein as "substantially constant."

As pulses, such as positive pulses, are applied continuously to the junction point 151, the voltage at the junction point will remain substantially constant, but the voltage on the cathode 162 of the cathode follower 147 will increase in a negative direction and in a stair-step fashion. This occurs since the extremely small positive steps at the junction point 151 are inverted and amplified about 150 times when they are developed on the cathode 162 of the triode 147. The voltage at the cathode 162 is applied through a variable resistor 167 and over a lead 170 to the grid of a tube 171 having a variable resistor 172 connected to its cathode. If a decreasing voltage is applied to the grid of the tube 171, the anode potential thereof will increase proportionally and this increasing voltage is applied to the grid of a tube 175. The tube 175 is connected with a tube 176 as a long-tailed pair. Consequently, a positive going potential on the grid of the tube 175 will cause a similar potential to develop on the cathodes of the tubes 175 and 176. When a positive going potential is impressed on the cathode of the tube 176, this tube tends to cut off so that the anode potential thereof increases.

The anodes of the tubes 175 and 176 are connected by leads 177 and 180, respectively, to opposite horizontal plates 181 and 182 of the oscilloscope 40. It can be seen then that with the provision of the tubes 175 and 176, a push-pull circuit is obtained so that when a voltage of one polarity is applied to the plate 181, a voltage of opposite polarity is applied to the plate 182. More particularly, when positive voltages are impressed on the anode of the tube 176, over the lead 180 and to a left-hand horizontal plate 182 of the oscilloscope 40 as described, corresponding negative voltages are impressed on the right-hand horizontal plate 181 of the oscilloscope 40 over the lead 177 connected to the anode of the tube 175.

The output of the oscillator 20 is utilized to develop the horizontal component of the oscilloscope sweep. As described above, the oscillator output appears at the anode 77 of the pentode 75 during six and one-half pulse periods of the signal to be indicated. Consequently, during this time, the oscillator output is taken from the anode 77 of the pentode 75 and fed over the lead 102 to a pair of tubes 185 and 186 in a pulse amplifier and shaper circuit 187. The tubes 185 and 186 are driven between cut off and their saturation points so that the output voltage thereof appearing at the anode of the tube 186 has a square waveform. This square wave voltage is impressed through a capacitor 190 so that it varies between a predetermined positive voltage and a negative voltage of equal magnitude. From the capacitor 190, the square wave voltage is applied to a tap 191 associated with a variable resistor 192 which forms a part of the voltage divider 161. Whether the positive or negative-going portion of these pulses renders the diode 156 or the diode 155, respectively, conductive depends upon the voltage condition at a reference point 195 which determines the voltage conditions throughout the divider 161, and more particularly, at the junction points 157 and 160.

The voltage at the reference point 195 is determined by which of two tubes 196 or 197 in the sweep control binary circuit 45 is conducting. As discussed hereinabove, when the start pulse was applied to the line 30, the no-current condition on the line 30 permitted the tube 57 to conduct, dropping its anode potential. This potential drop cut off the tube 60 increasing its anode potential and passing a positive potential through the diode 61 to render the tube 66 in the gate control binary circuit 70 conductive. It was also pointed out that thereafter, any marking or current condition on the line 30 resulted in a negative potential on the anode of the tube 60, which negative potential could not pass through the diode 61 and switch the operation of the tubes 66 and 67 in the gate control binary circuit 70. Consequently, throughout the full six and one-half pulse period operation of the pulse period counter tube 145, the tube 66 is conductive and the tube 67 is held nonconductive.

With the tube 67 nonconductive, its anode potential is at some positive value which is impressed on the grid of a buffer tube 201 and permits this tube to conduct. The buffer tube 201 is connected as a cathode follower, therefore, its cathode is likewise at some positive value which maintains the tube 196 in the sweep control binary circuit 45 conductive. When the tube 196 is conducting, its anode voltage drops and this drop is impressed through a resistor 202 to render the associated tube 197 nonconductive. The anode potential of the tube 197 thereupon rises, and this potential rise is impressed across leads 205 and 206 to the reference point 195. To use an illustrative example, assume that under the above-described conditions, the voltage at the reference point 195 is +100 volts. The frequency divider 161 can be so designed that the junction point 157 is at a potential of +20 volts and the junction point 160 at a potential of −8 volts. Also the junction point 151 can be made to be approximately zero volts, which will be maintained substantially constant at all times regardless of the voltage applied to the reference point 195. Another assumption is that the pulse amplifier and shaper circuit 187 is so designed that the magnitude of the square wave voltage (originally from the oscillator 20) appearing at the tap 191 of the resistor 192 varies between +10 and −10 volts.

Under the assumed conditions, each time the voltage on the tap 191 rises to +10, the lower diode 156 will conduct. This action occurs since the positive pulses of +10 volts appearing at the tap 191, when combined with the −8 volts at the junction point 160 by virtue of the +100 volts at the reference point 195, will result in a higher voltage, some positive voltage less than +2 volts, on the left side of the lower diode 156 than on the right side which is at approximately zero volts. In the case of the upper diode 155, the negative going pulses at −10 volts on the tap 191 will not combine with the +20 volts on the junction point 157 to allow the upper diode 155 to conduct. Consequently, only positive pulses are applied to the junction point 151 and the control grid 150 of the pentode 146. Because of the integrator action of the horizontal integrator circuit 42, the voltage on the cathode 162 of the triode 147 will steadily increase in a negative direction and in stair-step fashion each time a positive pulse is applied to the tap 191. As described above, this will result in a steadily-rising voltage being applied over the lead 180 and a corresponding negative voltage being applied over the lead 177. Since each step of the voltage is extremely small (for example, .003″/pulse), the resulting voltages being applied to the vertical plates 182 and 181 of the oscilloscope 40 will be the first half of a sawtooth voltage, as shown in waveform D in Fig. 2, during the first half of each pulse period.

Positive pulses are applied to the control grid 150 of the pentode 146 for the first five hundred counts of the hundreds counter tube 140. It will be remembered that five hundred counts were equal to one-half of a pulse period. When the fifth stage of the hundreds counter tube 140 conducts, a negative potential is applied through a diode 207 and over a lead 210 to a pair of capacitors 211 and 212. Each of the capacitors is connected to an associated one of the control grids of the tubes 196 and 197 in the sweep control binary circuit 45. The negative potentials being applied to the grids of these tubes will cause the conducting one of the tubes 196 and 197 to cut off and the opposite one to conduct. As described hereinabove, the tube 196 had been conducting until this time. Consequently, upon operation of the fifth stage of the hundreds counter tube 140 or after five hundred counts, the tube 197 will conduct, its anode voltage will decrease, and this decrease will be applied over the leads 205 and 206 to the reference point 195.

As an illustrative example, the decreased voltage at the reference point 195 may be +20 volts under these conditions. In this case, the voltage of the junction point 157 can be set at +8 volts and that of the junction point 160 at −16 volts. Thereafter, as the square wave voltages of +10 and −10 volts are applied to the tap 191, the upper diode 155 will conduct and the lower diode 156 will not conduct so that only negative pulses are applied to the junction point 151. This result is obtained since the negative-going portion of the pulses at the tap 191 and of a magnitude of −10 volts, when combined with the +8 volts at the junction point 157, results in a sufficiently negative potential (some negative value between 0 and −2 volts) at the junction point 157 to cause conduction of the upper diode 155. Conversely, the positive-going portion of the voltage at the tap 191 will not increase the voltage at the junction point 160 sufficiently to cause conduction of the lower diode 156. In this latter case, a potential of −6 volts (+10−16) is applied to the left side of the lower diode 156, and zero potential is on the right side thereof.

Consequently, for the last half of each signal pulse period, negative potentials will be applied to the control grid 150 of the pentode 146. These negative potentials will tend to cut off the pentode 146 so that its anode voltage will tend to rise. This voltage rise is applied to the grid of the cathode follower 147 and will appear on the cathode 162 thereof. This voltage rise will then be impressed over the lead 165 and through the capacitor 166 to the control grid 150 of the pentode 146 where it tends to balance the negative potential applied previously thereto. The voltage at the junction point 151 will, therefore, be maintained substantially constant, and the voltage on the cathode 162 of the tube 147 will be a positive voltage which steadily increases in stairstep fashion. This positive voltage will cause the anode of the tube 175 to be positive and the anode of the tube 176 to be at a corresponding negative potential. Consequently, the voltages applied to the horizontal deflecting plates 181 and 182 of the oscilloscope 40 will be the second half of the sawtooth voltage shown in waveform D of Fig. 2, which half decreases in value. This portion of the sawtooth causes the second half of the sweep representing each pulse period to move from right to left across the oscilloscope 40.

It can be seen then, that for each of the pulses including the start pulse, the five intelligence pulses, and approximately one-half of the stop pulse, a sawtooth voltage is applied to the horizontal plates 181 and 182 of the oscilloscope 40. This sawtooth voltage will rise for the first half of the pulse period to some positive value, after which it will decrease to substantially its original value at the completion of the pulse. At the completion of six and one-half pulse periods, it is necessary to clamp the horizontal component of the sweep at its point of origin. This point is shown diagrammatically at 215 in Fig. 3 and electrically, it will occur when the control grid 150 is exactly at zero or ground potential.

To accomplish the placing of the oscilloscope beam back to its point of origin, two negative voltages are applied to the control grid of a tube 216 (Fig. 7) at the end of six and one-half pulse periods. One of these voltages is obtained from the target of the seventh stage of the pulse period counter tube 145 (Fig. 8). The first two stages of this tube are operated during the stop and start impulses of the signal being applied to the line 30, and the next succeeding five stages are associated with the five intelligence impulses of such signal. When a switch 217 is in the "5" position as shown in Fig. 7, the seventh stage is connected thereto, and when the target associated with the seventh stage of the tube 145 operates, a negative voltage is applied through the switch 217, over a lead 218 and through a diode 220 to the grid of the tube 216. This voltage, of itself, is not sufficient to render the tube 216 nonconductive. However, during the operation of the sixth impulse stage of the pulse period counter tube 145 (the seventh stage of the tube), the hundreds counter tube 140 passes through all of its ten stages. When the fifth stage of the tube 140 operates, a negative voltage is taken from the spade associated therewith, passed over a lead 221 and through a diode 222 to the grid of the tube 216.

The conjoint application of these two negative voltages causes the tube 216 to cut off. When the tube 216 cuts off, its anode potential increases, and this increase in voltage is impressed through a diode 225, over the lead 35 and on a junction point 227 (Fig. 5). From there, this positive voltage passes over a lead 230, through a D.C. dropping neon tube 231 and to the grid of a sweep clamp tube 232 in the stop period clamp circuit 53, so that the tube 232 conducts heavily.

When the tube 232 conducts, its anode potential drops, and this drop is impressed over a lead 235 to a junction point 236. When the junction point 236 drops in potential, a diode 237 is rendered conductive and this action renders another diode 240 conductive, so that a connection 241 from ground potential to the junction point 236 is obtained. The negative potential on the junction point 236 will cause still another diode 242 to conduct so that ground potential is applied through the diodes 240 and 237, the junction point 236 and the diode 242 to the control grid 150 of the pentode 146 in the horizontal integrator circuit 42. Ground potential on the control grid 150 causes the integrator to return the electron beam to its furtherest position to the left, that is, causes the horizontal control voltage of the beam to place the beam in its original horizontal position.

Vertical component sweep

Referring to Fig. 3, it can be seen that after each five hundred counts, the oscilloscope sweep moves downward vertically. It is, therefore, obvious that the vertical component of the sweep differs from the horizontal component since the horizontal component increased to a positive value and then decreased to its original value at the completion of each pulse, that is, after one thousand counts. In the case of the vertical component of the sweep, it must decrease in value after each five hundred count and return to its original vertical level only after six and one-half pulse periods. As can be seen in Fig. 3, and waveform F of Fig. 2, such decreases in voltage are made of alternately different magnitudes to differentiate between the pulses to which the various portions of the sweep refer.

To explain the generation of the vertical component of the sweep, it will be remembered that the tubes 196 and 197 in the sweep control binary circuit 45 alternated between conduction and cut off after each five hundred count or one-half pulse as shown in waveform E in Fig. 2. When the anode voltage of the tube 196 increases in magnitude, this increase is passed over a lead 245, through a capacitor 246, a diode 247 and a resistor 248 to the grid of a vertical integrator tube 250. Likewise, when the anode voltage of the tube 197 increases in value, this increase is impressed through a capacitor 251, a diode 252 and the resistor 248 to the grid of the tube 250. By making the capacitor 251 greater in value than the capacitor 246, the length in time that the two positive pulses passing therethrough are being applied to the grid of the tube 250 can be made to differ.

Each time a positive pulse is impressed upon the grid of the vertical integrator tube 250, the tube tends to increase in conduction so that its anode potential tends to decrease. This decrease in voltage is fed back through a capacitor 255 to the grid of the tube 250 so that the grid voltage is maintained substantially constant during the application of each positive voltage. Upon application of succeeding positive voltages to the grid of the tube 250, the voltage of the anode thereof drops and these voltage drops are coupled back to the grid by the capacitor 255 to maintain the grid voltage substantially constant. As in the case of the horizontal integrator tube 146, the positive pulses being applied to the grid of the tube 250 will result in a positive stair-step voltage that increases progressively an extremely small amount. Again this voltage can be characterized as being "substantially constant." These decreases in voltage of the tube 250 are applied to the grid of a tube 256 which, in conjunction with a tube 257, forms another long-tailed pair to supply push-pull operation to vertical plates 260 and 261 of the oscilloscope 40. As the grid of the tube 256 decreases, its cathode and the cathode of the tube 257 decrease so that the tube 257 conducts. Consequently, the anode of the tube 256 has developed thereon a stair-step voltage increasing in value, and the anode of the tube 257 has developed thereon a proportionally negative voltage. These opposite voltages are applied, respectively, over leads 262 and 265 to the vertical plates 261 and 260 of the oscilloscope 40 and, when combined with the horizontal sawtooth voltage being applied to the horizontal plates 181 and 182, result in the ladder-type sweep shown in Fig. 3.

After six and one-half pulses, the vertical sweep circuits act similarly as the horizontal sweep circuits with respect to clamping the electron beam of the oscilloscope 40 back to its original position as shown at point 215 in Fig. 3. As described hereinbefore, after six and one-half pulses, a positive voltage from the anode of the tube 216 is impressed over the lead 35 to the junction point 227. This positive voltage is then passed over the lead 230, through the D.C. dropping tube 231 and to the grid of the tube 232. This tube increases in conduction so that its anode potential decreases in value. This decreased potential condition renders the diodes 237 and 240 conductive so that the ground potential at 241 is applied through the diode 240 to the grid of the vertical integrator tube 250. Under this condition, the tube 250 decreases in conduction and its anode voltage increases. This increase in voltage is impressed upon the grid of the tube 256 to cause the tube 256 to increase in conduction and the tube 257 to decrease in conduction. Since the voltage causing the change on the grid of the tube 250 is near ground potential, the voltages being applied to the vertical plates 261 and 260 from the anodes of the tubes 256 and 257, respectively, will bring the electron beam to its original uppermost position. When combined with the horizontal clamping of the electron beam described hereinabove, the electron beam will be placed at the point 215 in Fig. 3 to await the initiation of a start pulse from another signal on the line 30.

Calibration markers

To prevent parallax from introducing error when reading distortion on the oscilloscope 40, calibration markers are generated on the sweep itself in lieu of being printed on a transparent cover over the face of the oscilloscope. For extremely high accuracy in reading distortion in signals, 1%, 5% and 10% calibration markers are provided. To obtain the 1% markers, a lead 266 is connected to the lead 121 and to the tenth spade of the units counter tube 100. Since a stage of the tube 100 conducts each time an oscilloscope pulse is delivered thereto, there are one thousand successive conductions for each incoming pulse period. Consequently, if a voltage is taken from the tenth stage only each time the tube 100 conducts, there will be one hundred such negative voltages each pulse period. Therefore, if these negative pulses are differentiated by a capacitor 267 and are applied through a diode 270 to the lower vertical plate 261 of the oscilloscope 40, short calibration markers will be applied to the sweep at every one hundredth increment of the sweep in each pulse to provide 1% calibration markers directly on the sweep.

In a like manner, to obtain 5% markers, an output is taken from the target in the fifth stage of the tens counter tube 136 and applied over a lead 271, and through a differentiating capacitor 272 and a diode 275 to the lower vertical plate 261. One of these pulses will appear with and be added to every fifth 1% marker to give a higher marker at the 5% points. Similarly, to obtain 10% markers, a negative voltage is taken from the tenth spade of the tens counter tube 136 and applied over the lead 137 and a lead 276, through a differentiating capacitor 277 and a diode 280 to the vertical plate 261. This negative voltage, in conjunction with voltages forming the 1% and 5% markers, results in a still higher calibration marker to indicate the 10% points. It will be noted that as a signal impulse is presented on the oscilloscope, if a transition pip exists where a calibration marker exists, the calibration mark will merely appear to "ride" on the impulse instead of on the sweep. This representation will tend to increase the accuracy of reading the distortion in the signal impulse.

It is obvious that even other calibration markers of smaller value than 1% can be easily acquired with the counters provided by the invention. For example, if a large enough oscilloscope were being used or if even higher accuracy were desired, 0.5% markers could be easily obtained. In this case, a lead (not shown) would be connected to the spade or target in the fifth stage of the units counter tube 100 and connected through a differentiating capacitor and a diode (neither shown) to the lower vertical plate 261 of the oscilloscope 40. When so provided, the 0.5% markers would be smallest in height and the 1%, 5% and 10% markers would be increased to a correspondingly greater height due to the additional negative voltages from the fifth stage of the tube 100 from which they are formed.

It will also be noted that if the sweep on the oscilloscope is expanded in a horizontal direction, the calibration markers will likewise move apart so that at no time can an inaccuracy occur as in the case where calibration markers are merely printed on a transparent covering that is placed over the face of the oscilloscope. With this older method, the oscilloscope sweep had to be aligned with the printed calibration markers for accurate reading of the oscilloscope presentation. With the indicator embodying the invention, it is only necessary to adjust the variable resistor 172 (marked "horizontal positioning" in Fig. 5) to acquire any desired horizontal width of the sweep on the oscilloscope 40. Since the calibration markers move with the sweep, the amount of distortion in a signal presented thereon can be read accurately at all times.

*Distortion class indicator*

In describing the operation of the sweep control binary circuit 45, it was stated that the tube 196 conducts during the first five hundred counts of the counters 24 to 27, inclusive. Also, at this time, the first half of the sawtooth voltage shown in waveform D of Fig. 2 is increasing in a positive direction for the first five hundred counts of each pulse period. It was stated further that the outgoing or left-to-right portion of the sweep for each pulse period was being presented on the oscilloscope 40 (Fig. 3) at this time. Since the tube 196 is conducting, the tube 197 is cut off, and its anode has a positive voltage thereon. This positive voltage is impressed over the lead 206 and onto a lead 281 indicated in Fig. 4 as "+ outgoing." This means that during each outgoing portion of the sweep, or during the first five hundred counts of each pulse period, a positive voltage appears on the lead 281.

As was stated in the description of the sweep control binary circuit 45, the tube 196 is cut off during the last five hundred counts of the counters 24 to 27, inclusive. This can be readily seen from the waveform E of Fig. 2. It can be seen therein that the tubes 196 and 197 alternate between conduction and cut off after each one-half pulse period or five hundred counts. Consequently, since the tube 196 is cut off during the last half of each pulse period, a positive voltage is developed on the anode thereof during these intervals. A lead 282 is connected to the anode of the tube 196 and marked "+ incoming" in Fig. 4, which means that during the last half of each pulse period, when the oscilloscope sweep is incoming or moving from right-to-left as viewed in Fig. 3, there is a positive potential applied to the lead 282.

The outgoing lead 281 and the incoming lead 282 are each connected to the grids of two of a group of four thyratrons 285 to 288, inclusive. The connections to the grids are similar for each of the leads 281 and 282 in that the leads are connected through a resistor 290 to a junction point 291. Each resistor 290, together with one of a group of resistors 292—292 and a resistor 293, forms a voltage divider with the resistor 293 connected to a source 294 of negative potential. Consequently, a positive voltage is applied to the grids of the thyratrons 285 and 288 through the resistors 290—290 during the first or outgoing half of each pulse period, and a positive voltage is applied to the grids of the thyratrons 286 and 287 through the resistors 290—290 during the last or incoming half of each pulse period.

The positive voltages being applied to the grids of the thyratrons 285 to 288, inclusive, over the leads 281 and 282 are not of sufficient magnitude to render the thyratrons conductive because the connections of the thyratron grids to the negative source 294 of voltage prevent such conduction. When, however, the thyratrons 285 to 288, inclusive, conduct, an associated one of a group of neon lamps 295 to 298, inclusive, is energized. The lamps 295 to 298, inclusive, are marked, respectively, in Fig. 4 as indicating marking end distortion, spacing end distortion, marking bias and spacing bias. As typical in the operation of thyratrons, once positive voltages of sufficient magnitude are applied to the grids thereof to render the thyratrons 285 to 288, inclusive, conductive, the removal of such positive voltages from the grids will not render the tubes nonconductive. Consequently, when any of the thyratrons 285 to 288, inclusive, conduct to energize any of the lamps 295 to 298, inclusive, the lamps will remain energized until a reset switch 299 is opened to remove the anode voltage from each of the thyratrons.

In describing the operation of the distortion class indicator 55, reference is made to waveform G in Fig. 2. In that figure, for illustrative purposes only, each type of distortion is shown on the Number 1 pulse which is marking. It can be seen that when a signal has marking bias therein, the space-to-mark transition occurs before it is theoretically due. In other words, the space-to-mark transition occurs in the last half of the preceding pulse period. During the last half of the preceding or any pulse period the counters 24 to 27, inclusive, included in the invention are going through the last five hundred counts and the sweep is moving from right-to-left, that is, through its incoming portion. Consequently, a positive voltage is being impressed upon the incoming lead 282 and is being applied to the grids of the thyratrons 286 and 287. As explained hereinabove, neither of these tubes can conduct with only this one positive voltage being applied to the grids.

To obtain a second positive voltage on the grid of the thyratron 287 so that marking bias will be indicated by energization of the neon lamp 297, reference is had again to the waveform G in Fig. 2. During the start pulse, a spacing condition is being applied to the line 30. As described hereinabove, this spacing or no-current condition will permit the tube 57 to conduct. Assuming that marking bias is present in the signal, a space-to-mark transition occurs before the normal end of the start pulse. Consequently, a marking or current condition is applied to the line 30 before it is due. This current condition develops a voltage across the cathode resistor 56 associated with the tube 57 so that the tube 57 is cut off thereby. When this tube is cut off, its anode voltage rises, and this rise in voltage is impressed over a lead 300, through a capacitor 301 and to the grid of the thyratron 287. Consequently, the thyratron 287 fires, and the neon lamp 297 energizes indicating the signal has marking bias therein.

The positive voltage on the lead 300 is also applied through a capacitor 302 to the grid of the thyratron 288, but since no positive voltage is being applied to this grid from the outgoing lead 281 at this time, this thyratron will not fire. It will be noted also that when the anode potential of the tube 57 increased, this increase was impressed upon the grid of the tube 60 to render the tube 60 conductive. When the tube 60 becomes conductive, its anode voltage drops, and this drop is impressed over a lead 305, through capacitors 306 and 307 to the grids of the thyratrons 285 and 286. These two tubes are ones that should not fire at this time, and this negative voltage will obviously prevent their firing.

In a similar fashion, when spacing bias exists in a signal, a space-to-mark transition is retarded from its normal position as shown in waveform G of Fig. 2. This transition occurs, therefore, during the first half of the first intelligence impulse or during the first five hundred counts. Also, the first five hundred counts occur during the outgoing portion of the sweep, that is, during the left-to-right movement of the sweep. Consequently, a positive voltage is applied over the outgoing lead 281 to the grids of the thyratrons 285 and 288. Since spacing bias is caused by a retarded space-to-mark transition, the signal on the line 30 is marking after the transition should occur. Consequently, current flows over the lead 30 and the tube 57 is cut off. Its anode voltage, therefore, increases in value. This increase in voltage is applied over the lead 300, through the capacitors 301 and 302 and to the grids of the thyratrons 287 and 288. Since, of these two, only the thyratron 288 has a positive voltage applied to its grid from the outgoing lead 281, the thyratron 288 will fire, and the neon lamp 298 will energize to indicate that spacing bias is present in the signal.

When spacing end distortion is present in a signal, a mark-to-escape transition occurs before it is normally due. Referring to waveform G of Fig. 2, it can be seen that spacing end distortion will occur in a signal during the last five hundred counts, or the incoming portion of the oscilloscope sweep. Consequently, a positive voltage will be applied over the incoming lead 282 to the grids of the thyratrons 286 and 287. Also, at the time that the signal goes spacing, a no-current condition exists on the line 30 and the tube 57 is rendered conductive. When the tube 57 conducts, its anode potential drops to cut off the tube 60. When the tube 60 is cut off, its anode potential rises, and this rise is impressed over the lead 305 and through the capacitors 306 and 307 to the grids of the thyratrons 285 and 286. Since, of these two thyratrons, only the grid of the thyratron 286 has been conditioned by the application of a positive voltage thereto from the incoming lead 282, the thyratron 286 will fire, and the neon lamp 296 will energize to indicate that spacing end distortion is present in the signal.

Finally, when marking end distortion is present in a signal, a mark-to-space transition occurs during the first half of the next succeeding pulse, as can be seen in waveform G of Fig. 2. Consequently, this transition occurs during the first five hundred counts or at a time when the sweep on the oscilloscope is moving from left to right and is outgoing. A positive voltage will then be applied over the outgoing lead 281 to the grids of the thyratrons 285 and 288. Again, the extended marking condition of the input signal maintains the tube 57 conductive and the tube 60 cut off so that the anode potential of the latter is positive. This positive voltage is impressed over the lead 305 and through the capacitors 306 and 307 to the grids of the thyratrons 285 and 286. Since, of these two thyratrons, only the grid of the thyratron 285 has a second positive voltage applied thereto from the outgoing lead 281 at this time, only this thyratron will fire to energize the neon lamp 295 which indicates that marking end distortion is present in the signal.

*Tolerance circuit*

The description of the distortion class indicator 55 assumes that each incoming signal on the line 30 is a perfect signal, that is, if no distortion were present therein, the various transitions would occur at an exact, predetermined time. Since telegraph signals are subject to many sources of distortion during their generation and transmission, such a perfect signal is virtually never attained. Consequently, all receivers of telegraph signals have a certain amount of tolerance to distortion in the signal being received. Therefore, if some tolerance is to be permitted, it may be desirable to prevent the distortion class indicators from operating when the distortion in a signal is within the preset tolerances.

Assume, therefore, that a tolerance of 5% on either side of a theoretically-perfect transition can be tolerated. With respect to the counting system embodied in the present invention, this percentage of tolerance means that a mark-to-space or space-to-mark transition can occur fifty counts on either side of the time that it is theoretically due to occur. Obviously, fifty counts out of one thousand counts will result in the desired 5% tolerance on either side of the theoretically-perfect transition.

Referring to Fig. 7, the circuit provided to attain this 5% tolerance includes a plurality of diodes 310—310 connected to the targets in the first five stages of the tens counter tube 136. The lower sides of the diodes 310—310 are connected together and through a resistor 311 to a junction point 312. A connection is then made from the junction point 312, through a diode 313 to a junction point 315. Also, a second plurality of diodes 316—316 are connected similarly to the last five stages of the tens counter tube 136 with their lower ends being connected together and through a resistor 317, a junction point 318 and a diode 320 to the junction point 315.

Also included in the tolerance circuit are leads 321 and 322 which are connected, respectively, to the targets in the ninth and tenth stages of the hundreds counter tube 140. When a negative potential is applied to the lead 321 by operation of the ninth stage of the hundreds counter tube 140, a diode 325 is rendered conductive thereby, to apply a negative potential through a resistor 326 to the junction point 318. In a similar manner, when the tenth stage of the hundreds counter tube 140 conducts, a negative potential from the target associated therewith is impressed over the lead 322 to the junction point 312. The junction point 315 is connected by a lead 327 through a junction point 330 to the source 294 of negative voltage which acts as a biasing voltage on the diodes 313 and 320. Consequently, if only the first five and the last five stages of the tens counter tube 136 were operating, the negative potentials passing through the diodes 310—310 and 316—316 and to the junction points 312 and 318, respectively, would not be sufficient to render the diodes 313 and 320 conductive.

When, however, the ninth stage of the hundreds counter tube 140 is operating, the second negative potential that is impressed over the lead 321 to the junction point 318 is sufficient to render the diode 320 conductive. Thereafter, a negative voltage is impressed on the lead 327 and to the grids of the thyratrons 285 to 288, inclusive, to prevent the thyratrons from firing during the time that the last five stages of the tens counter tube 136 are operating. In similar manner, each time that the first five stages of the tens counter tube are operating, a negative potential is applied through the diodes 310—310 to the junction point 312. Then, during the operation of the tenth stage of the hundreds counter tube 140, the negative potential impressed over the lead 322 and to the junction point 312 causes the diode 313 to conduct. Again, a negative voltage is impressed on the lead 327 and to the grids of the thyratrons 285 to 288, inclusive, to prevent the thyratrons from firing during this time interval.

It can be seen then that since one thousand pulses from the oscillator 20 occur during one pulse period, each stage of the hundreds counter tube 140 operates for one hundred counts. The ninth stage of the hundreds counter tube 140 operates during the nine hundred to ten hundred counts and the tenth stage during the zero to one hundred counts of the succeeding pulse. Therefore, by virtue of the connections of the diodes 310—310 and 316—316, the distortion class indicators are prevented from being energized from the time of the 950 count to the first 50 counts of the next succeeding pulse. Consequently, the desired result of preventing the distortion class indicators from energizing for 5% of the signal pulse on either side of the beginning of each pulse period is obtained.

It may be desirable to vary the amount of tolerance to incoming signals that will be permitted before the distortion class indicator will operate to energize the neon lamps 295 to 298, inclusive. With the fixed connections of the diodes 310—310 and 316—316 to the first five and the last five stages of the tens counter tube 136, respectively, a fixed 5% tolerance is obtained. If this tolerance were desired to be variable, a simple arrangement which will short out a given number of diodes (similar to the diodes 310—310) in the first stages of the tube 136 and an equal number of diodes (similar to the diodes 316—316) in the last stages thereof may be provided. For example, if 2% tolerance on either side of a theoretically-perfect transition were desired, the lower ends of only two diodes 310—310 in the first and second stages of the tube 136 and the lower ends of only two diodes 316—316 in the ninth and tenth stages of the tube 136 would be shorted together simultaneously. Consequently, the thyratrons 285 to 288, inclusive, would be prevented from operating each pulse period from a count of 980 to a count of 20 of the next-succeeding pulse period, or for 2% of the pulse periods on either side of the perfect transition.

With the above-described arrangement, the circuit connections to the tens counter tube 136 can be used to obtain a tolerance to signals having from zero to 10% distortion therein. For 10% distortion, diodes similar to the diodes 310—310 would be connected to all of the stages of the tube 136 with the lower ends thereof shorted together and connected to the junction point 312. Also, diodes similar to the diodes 316—316 would be connected to all of the stages of the tube 136 and their lower ends connected together and to the junction 318. If tolerances above 10% were desired, similar connections of diodes similar to the diodes 310—310 and 316—316 can be made to the hundreds counter 140.

Miss counter circuit

As stated hereinabove, when one of the neon lamps 295 to 298, inclusive, is energized, it remains energized until the reset switch 299 is opened. During the time between energization of one of the lamps and the de-energization thereof by the opening of the switch 299, other distorted transitions may exist on the signals being applied to the line 30. It is, therefore, desirable to provide a counter for adding the total number of distorted pulses that exist in a predetermined time interval. This circuit is referred to herein as a "miss counter" to differentiate it from the counter circuits 24 to 27, inclusive.

When describing the distortion class indicator, it was stated that the joint application of two positive voltages to any of the grids of the thyratrons 285 to 288, inclusive, would render that thyratron conductive. The grids of the thyratrons 285 and 286 are connected through the capacitors 306 and 307, respectively, to a junction point 331, and the grids of the thyratrons 287 and 288 are connected through the capacitors 301 and 302, respectively, to a junction point 332. The junction points 331 and 332 are connected through two diodes 335 and 336, respectively, to another junction point 337.

Consequently, if marking end distortion or spacing end distortion is present in the signal in the line 30, a positive voltage sufficient to fire the thyratrons 285 and 286 appears on the junction point 331 and through the diode 335 to the junction point 337. Also, if marking bias or spacing bias is present in the signal on the line 30, a positive voltage sufficient to fire the thyratrons 287 and 288 appears on the junction point 332 and through the diode 336 to the junction point 337. It can be seen then, that if any type of distortion is present in the signal on the line 30, a voltage will appear on the junction point 337 that is sufficient to fire the thyratron 285, 286 or 288 that is associated with the type of distortion present.

The positive voltage appearing on the junction point 337 each time some type of distortion is present is impressed through a capacitor 340 to the grid of a tube 341. Each time a distortion-generated pulse is applied to the grid, the tube 341 will conduct heavily, and the current passing through the tube is used to energize a coil 342 that forms part of a counting device (not shown). Thus, during any given time interval, the number of distorted transitions or "misses" in the signal on the line 30 can be counted. Since some of these transitions may occur during a time that is within the tolerance permitted, circuitry must be provided for preventing the recognition of a miss by the counting device at this time.

To prevent such a recognition of a miss, the grid of the tube 341 is connected through a resistor 345 and the cathode thereof is connected through a resistor 346 to a junction point 347. The junction point is connected in turn through a resistor 350 to the junction point 330. As described hereinabove, during the time interval that distortion is to be tolerated, a sufficiently-negative voltage is applied to the junction point 330 and to the grids of the thyratrons 285 to 288, inclusive, to prevent the thyratrons from firing. This negative voltage will, therefore, also bias the tube 341 such that it cannot conduct and cause energization of the coil 342 to register a count on the counting device.

As an illustrative example, assume that the positive voltage that appears on the junction point 337 and, hence, on the grid of the tube 341 each time some type of distortion is present on the signal on the line 30, is +10 volts. Assume also that during the time without the period of tolerance the voltage at the junction point 330 is −15 volts and that during the time within such period the voltage at the junction point is −35 volts. The resistor 350 will drop these negative voltages somewhat, and it can be so chosen that −10 volts appear on the junction point 347 at times not within the tolerance period and −28 volts appear at times within such period.

Consequently, at times not within the period of tolerance, since the voltage on the grid of the tube 341 is +10 volts each time distortion is present and that on the junction point 347 is −10 volts, the −10 volt bias is overcome, the tube 341 will conduct when distortion is present and the counter coil 342 will be energized. However, during the period of tolerance, when it is desired not to register distortion, the −28 volts on the junction point 347 is not overcome by the pulses of +10 volts being applied to the grid of the tube 341, so that the tube 341 cannot conduct to register the distortion as a miss.

Signal display circuit

As described above, the ladder-type sweep shown in Fig. 3 is initiated by the start pulse of each incoming character being applied to the line 30. There will be represented on the oscilloscope 40 a sweep showing the condition of the start pulse, five intelligence pulses and approximately one-half of the stop pulse. Since this display is under the control of the start pulse of each incoming character, distortion in the pulses making up the character can be shown by merely placing a pip on the sweep each time a signal transition from marking to spacing or from spacing to marking occurs. With the distortion signal indicator embodying the invention, a space-to-mark transition will appear as a positive pip on the sweep and a mark-to-space transition will appear as a negative pip.

To apply these pips indicating signal transitions to the oscilloscope 40, the lead 300 is connected to the differentiating capacitor 36 and to the lead 37. The lead 37 is connected directly to the lower vertical plate 261 of the oscilloscope 40. As described hereinbefore, the voltage on the anode of the tube 57 is a replica of the signal being applied to the line 30. Consequently, as the signal on the line 30 undergoes a space-to-mark transition, the tube 57 is cut off and the anode potential thereof rises. This rise in potential is differentiated by the capacitor 36, and a positive pulse is impressed over the lead 37 to the lower vertical plate 261 of the oscilloscope. As a result, a positive-going pip is presented on the oscilloscope sweep to indicate the space-to-mark transition. Conversely, when a mark-to-space transition is applied to the line 30, the tube 57 is rendered conductive, and the resulting drop in anode potential is differentiated by the capacitor 36 to place a negative pulse on the lower vertical plate 261 and to represent the mark-to-space transition as a negative pip on the oscilloscope.

To illustrate a signal having distortion in a spaceto-mark transition and in a mark-to-space transition, refer to the waveform A in Fig. 2. Assume that 20% marking bias exists in the Number 1 pulse and that 24% marking end distortion exists in the Number 2 pulse. Referring now to Fig. 3, a negative pip 351 appears representing the initiation of the start pulse. This pip is negative since the transition that it represents is a mark-to-space transition. If the signal in the waveform A were perfect, a positive pip would appear at the initiation of the Number 1 pulse period. But since 20% marking bias exists in the signal, a space-to-mark transition appears 200 (.20×1000) counts before it is due, or, during the latter half of the start pulse. Consequently, a positive pip will appear at 352 on the incoming (right-to-left) portion of sweep representing the start impulse. The marking end distortion present in the Number 2 pulse will cause a mark-to-space transition to occur during the first half of the third pulse. Consequently, a negative pip 355 will start at the 24% marker of the outgoing portion of the sweep representing the Number 3 pulse. The calibration markers will appear on the trailing end of the pips shown in Fig. 3. With this provision, the actual percentage distortion can be read more accurately should a pip exist between the calibration markers.

The signal distortion indicator so far described is used to analyze distortion in signals of the five-unit, Baudot code type. It was stated hereinabove that when such signals are to be analyzed, the switch 217 (Fig. 8) is in the "5" position. With this connection, the electron beam of the oscilloscope 40 is returned to its original position at point 215 (Fig. 3) after six and one-half pulse periods. To analyze distortion in signals having six units of intelligence pulses, the switch 217 is placed in the "6" position so that the electron beam is returned to its original position after seven and one-half pulse periods. Consequently, the start pulse and six intelligence pulses will be represented on the oscilloscope 40. In like manner, with the switch 217 in the "7" position, signals having seven intelligence pulses can be displayed on the oscilloscope 40. In this case, the electron beam will be returned to its original position after eight and one-half pulse periods, and the start pulse and the seven intelligence pulses will be displayed for analyzation.

Various modifications of the invention are obvious to those skilled in the art to which the invention appertains. For example, in lieu of providing a ladder-type sweep, a triangular sweep of the type shown in Fig. 10 may be provided. To obtain this type of sweep with the circuit shown in Figs. 4 to 8, inclusive, it is merely necessary to connect the output of the gate control binary circuit 70 appearing on the lead 71 (Fig. 4) to the junction of the diodes 247 and 252 and the resistor 248 in the input circuit of the vertical integrator 51 (Fig. 5). With this connection, the vertical integrator generates a voltage that is continuously increasing in value and in a negative direction during the entire period of a character on the signal line 30. This causes a linear downward deflection of the vertical position of the beam and, since the horizontal integrator circuit 42 is not affected, the sweep will move back and forth across the oscilloscope 40 as shown in Fig. 10.

Also, each pulse of the signal on the line 30 can be represented by a single straight line sweep as shown in Fig. 11. This can be accomplished with the circuit shown in Figs. 4 to 8, inclusive, by merely opening the circuit to the diode 247 (Fig. 5). With this portion of the circuit open, a vertical deflection of the sweep is obtained only at the beginning of each outgoing portion of the sweep so that both the outgoing and incoming portions thereof are seen as a straight line as shown in Fig. 11. Since the mark-to-space and space-to-mark transitions appear as part of the sweep, and since these pips point in the direction of the sweep at the time of the transition as negative and positive pips, respectively, there will be no confusion as to which of the sweeps, outgoing or incoming, the pips apply.

It is to be understood that the above-described arrangements and construction of elements are simply illustrative of the invention and many other modifications may be made without departing from the spirit and scope thereof.

What is claimed is:

1. A signal distortion indicator which comprises cathode ray means having a pair of deflection plates, an integrator circuit having an output connected to the plates, means for generating voltage pulses that are positive and negative with respect to a reference voltage, and means for applying series of predetermined numbers of the positive and negative pulses alternately to the integrator circuit to develop at the output thereof a voltage having a triangular waveform.

2. An apparatus for analyzing distortion in telegraph signals, which comprises a cathode ray tube having a pair of deflection plates, an integrator circuit, means for connecting an output from the integrator circuit to the deflection plates, a counting circuit for developing a plurality of output voltages at predetermined timed intervals, and means connected to and controlled by the counting circuit for alternately applying two series of pulses of opposite polarity to the input of the integrator circuit at predetermined ones of the timed intervals and for developing at the integrator circuit output a voltage having a triangular waveform.

3. An apparatus for analyzing distortion in telegraph signals, which comprises a cathode ray tube having a pair of deflection plates, an integrator circuit having an output connected to the plates, a mixing circuit having an output connected to an input of the integrator circuit, an oscillator connected to the mixing circuit input for applying thereto a plurality of voltage pulses that alternate above and below a reference voltage, means connected to the mixing circuit input and reacting with the oscillator pulses to develop at the mixing circuit output series of pulses that are either positive or negative with respect to the reference voltage, and a counting circuit having an input connected to the oscillator and energized by the pulses therefrom for causing the last-mentioned means to apply the series of positive and the series of negative pulses to the input of the integrator circuit alternately.

4. An apparatus for analyzing distortion in code impulse signals, which comprises a cathode ray tube having pairs of horizontal and vertical deflection plates, a first integrator circuit having an output thereof connected to the horizontal plates, means for applying two series of voltage pulses of opposite polarity alternately to the first integrator circuit at timed intervals to develop at the output thereof a horizontal component of the cathode ray sweep having a triangular waveform, a second integrator circuit having an output thereof connected to the vertical plates, means for applying voltages of one polarity to the second integrator circuit to develop at the output thereof a vertical component of the cathode ray sweep having a progressively-increasing magnitude, and means for applying the impulse signals to the vertical plates.

5. An apparatus for analyzing distortion in telegraph signals having a plurality of code impulses, which comprises an oscillator, a counter circuit connected to the oscillator and having a plurality of stages which are operated successively thereby, a plurality of output circuits, each of the output circuits connected to a corresponding one of the stages of the counter circuit for obtaining therefrom and upon the operation thereof voltages that correspond to predetermined points on the associated code impulses, a cathode ray tube having horizontal and vertical deflection plates, a horizontal integrator circuit means connected to the oscillator and to predetermined output circuits of the counter stages that operate at the midpoint and the end point of each of the code impulses for developing two series of alternate positive and negative pulses and for applying such series of pulses to the horizontal integrator circuit for developing therein a voltage having a triangular waveform means for applying the voltage of triangular waveform to the horizontal deflection plates, a vertical integrator circuit including means controlled by the predetermined output circuits for developing therein a voltage of one polarity and for continuously-increasing magnitude and applying such voltage to the vertical deflection plates, the combined application of voltages being applied to the deflection plates of the cathode ray tube resulting in a ladder-type sweep being presented thereon, means connecting predetermined ones of the output stages to the vertical deflection plates to provide calibration markers directly on the ladder-type sweep, and means for applying the telegraph signals to one of the vertical deflection plates.

6. An apparatus for analyzing distortion in telegraph signals having a plurality of code impulses, which comprises a cathode ray tube having a pair of horizontal deflection plates and a pair of vertical deflection plates, a horizontal integrator circuit having an output connected to the horizontal plates, a vertical integrator circuit having an output connected to the vertical plates, a mixer circuit connected to the horizontal integrator circuit input, an oscillator circuit, means for applying output pulses from the oscillator circuit to the input of the mixer circuit for the duration of each signal to be analyzed, a counter circuit connected to the oscillator circuit, driven by the output pulses therefrom and designed to develop at a plurality of outputs thereof control voltages after the first half and after the completion of each code impulse, means for applying the output voltages from the counter circuit to the mixer circuit so that for one-half of each code impulse only oscillator pulses that are positive with respect to a reference voltage are applied to the integrator circuit input and for the second half of each code impulse only oscillator pulses that are negative with respect to the reference voltage are applied to the integrator circuit input to develop at the horizontal integrator circuit output a voltage having a triangular waveform, means for applying the oscillator output pulses to the vertical integrator circuit such that pulses of only one polarity with respect to the reference voltage are applied thereto to develop at the vertical integrator circuit output a voltage that increases in magnitude in one direction, and means for applying the code impulses directly to one of the vertical plates.

7. An apparatus for analyzing distortion in telegraph signals having a plurality of code impulses, which comprises a cathode ray tube having a pair of horizontal deflection plates, a sweep circuit for the cathode ray tube, the sweep circuit including an oscillator, a gating circuit connected to an output of the oscillator and permitting the oscillator output to pass therethrough for predetermined time intervals, a shaping circuit connected to the oscillator output and causing output pulses of the oscillator to alternate above and below a reference voltage, a counter circuit driven by the oscillator and providing a plurality of output voltages at times corresponding to the completion of the first half of each code impulse and the whole of each code impulse, a voltage divider, means for applying the output pulses from the shaping circuit to the voltage divider, a binary circuit having an input connected to the output of the counter circuit and an output connected to the voltage divider for providing in the voltage divider two alternate voltage conditions, an integrator circuit, a pair of diodes connected oppositely between the voltage divider and an input of the integrator circuit so that the combined effect therein of the two alternate voltage conditions and the oscillator pulses renders the diodes conductive alternately to provide two series of pulses at the integrator circuit input that are alternately positive and negative with respect to the reference voltage and to provide a voltage having a triangular waveform at the integrator circuit output, and means for applying the integrator circuit output to the deflection plates.

8. An apparatus for analyzing distortion in telegraph signals having a plurality of code impulses, which comprises an oscilloscope having a pair of horizontal deflection plates and a pair of vertical deflection plates, an oscillator having a frequency that is a predetermined multiple of the frequency of the code impulses, a counter circuit connected to and driven by the oscillator and having a plurality of output circuits that provide voltages corresponding in time to predetermined portions of the code pulses, a sweep control binary circuit connected to the counter output circuits to provide output potentials that correspond to the midpoint and to the end of each code impulse, a horizontal integrator circuit of the type wherein the application to an input thereof of series of pulses that are alternately positive and negative with respect to a reference voltage results at an output thereof in a voltage having a triangular waveform, means connecting the output potentials of the binary circuit and the oscillator to the horizontal integrator input and controlled thereby to provide at such input a first series of voltage pulses of one polarity for the first half of each code impulse and a second series of voltage pulses of the opposite polarity for the second half of each code impulse, means connecting the output of the horizontal integrator to the horizontal deflection plates, a vertical integrator circuit of the type wherein the application to an input thereof of voltage pulses of one polarity results at an output thereof in a continuously-increasing voltage of one polarity, means for connecting voltages of one polarity only from the binary circuit to the input of the vertical integrator circuit, means connecting the output of the vertical integrator to the vertical deflection plates, means connecting predetermined output circuits of the counting circuit to the vertical deflection plates to provide calibration markers directly on the sweep formed by the outputs of the horizontal and vertical integrators, and means connecting the telegraph signals to one of the vertical deflection plates.

9. An apparatus for analyzing distortion in code impulse signals, which comprises a cathode ray tube having a pair of horizontal deflection plates, an integrator circuit having an output connected to the deflection plates and being of the type wherein the alternate application of voltages that are positive and negative with respect to a reference voltage to an input thereof results in a voltage having a triangular waveform at the output thereof, an oscillator having a frequency which is a predetermined multiple of the frequency of the code impulses, a counter circuit connected to the oscillator and having a plurality of stages which are operated successively thereby, an output circuit connected to each of the counter stages to obtain therefrom voltages that occur in predetermined timed relation with respect to each of the code impulses, a voltage divider, a pair of diodes connected oppositely between the voltage divider and the input of the integrator circuit, a binary circuit including two vacuum tubes that are so connected that the conduction of either one holds the other non-conductive, means connected to the output circuits of the counter stages that operate at the midpoint and at the end of each code impulse for applying voltages to the binary circuit such that one of the tubes therein conducts during the first half of each code impulse and the second conducts during the last half thereof, means connecting an output of the binary circuit to the voltage divider to establish therein two voltage conditions determined by which of the two tubes in the binary circuit is conductive, a shaper circuit connected to the output of the oscillator for squaring the oscillator pulses and causing them to alternate above and below the reference voltage, and means for applying an output from the shaping circuit to the voltage divider so that the shaper circuit output combines with the output of the binary circuit to place at the integrator circuit input a first series of pulses of one polarity during one-half of each code impulse and a second series of pulses of the opposite polarity during the second half of each code impulse.

10. A sweep generator for a cathode ray means having deflection means, which comprises an integrator circuit having an output connected to the deflection means, means for generating voltage pulses that are positive and negative with respect to a reference voltage, and means for applying series of predetermined numbers of the positive and negative pulses alternately to the integrator circuit to develop at the output thereof a voltage having a triangular waveform.

References Cited in the file of this patent

UNITED STATES PATENTS

| | | |
|---|---|---|
| 2,414,096 | Dimond | Jan. 14, 1947 |
| 2,434,264 | Edson | Jan. 13, 1948 |
| 2,668,192 | Cory | Feb. 2, 1954 |
| 2,705,261 | Canfora et al. | Mar. 29, 1955 |

OTHER REFERENCES

Publication: AIEE Technical Paper No. 54–105 of December 1953; "A New Portable Telegraph Transmission Measuring Set," by S. I. Cory; 7 pages.

UNITED STATES PATENT OFFICE
CERTIFICATE OF CORRECTION

Patent No. 2,909,604

October 20, 1959

Joseph Gardberg

It is hereby certified that error appears in the printed specification of the above numbered patent requiring correction and that the said Letters Patent should read as corrected below.

Column 20, line 75, after "circuit" insert a comma; column 21, line 6, after "waveform" insert a comma; line 16, for "stages" read -- circuits --.

Signed and sealed this 31st day of May 1960.

(SEAL)
Attest:

KARL H. AXLINE
Attesting Officer

ROBERT C. WATSON
Commissioner of Patents